United States Patent
Chang et al.

(10) Patent No.: US 6,617,711 B2
(45) Date of Patent: Sep. 9, 2003

(54) HAND-HELD ELECTRIC APPLIANCE POWER-SAVING SWITCH CONTROL MECHANISM

(75) Inventors: Shuo-Hung Chang, No. 168, Keelung Rd., Sec. 3, Taipei (TW); An-Yoil Yen, Hsichih (TW)

(73) Assignees: Shuo-Hung Chang, Taipei (TW); W-Link System, Inc., Hsichih (TW)

( * ) Notice: Subject to any disclaimer, the term of this patent is extended or adjusted under 35 U.S.C. 154(b) by 0 days.

(21) Appl. No.: 09/984,758

(22) Filed: Oct. 31, 2001

(65) Prior Publication Data

US 2002/0063477 A1 May 30, 2002

(30) Foreign Application Priority Data

Nov. 27, 2000 (TW) ...................................... 89220565 U

(51) Int. Cl.[7] ................................................. H01H 3/26
(52) U.S. Cl. ..................................... 307/140; 340/407.2
(58) Field of Search ................................. 307/116, 140; 340/500, 407.2; 200/430.5

(56) References Cited

U.S. PATENT DOCUMENTS

| | | | | |
|---|---|---|---|---|
| 4,806,502 A | * | 2/1989 | Jorke et al. | 438/492 |
| 5,380,983 A | * | 1/1995 | Cavada et al. | 219/250 |
| 5,783,813 A | * | 7/1998 | Metlitsky et al. | 235/462.45 |
| 6,225,987 B1 | * | 5/2001 | Matsuda | 345/179 |
| 6,418,536 B1 | * | 7/2002 | Park | 713/323 |
| 6,452,501 B1 | * | 9/2002 | Tse et al. | 340/640 |

* cited by examiner

*Primary Examiner*—Brian Sircus
*Assistant Examiner*—Sharon A. Polk
(74) *Attorney, Agent, or Firm*—Bacon & Thomas, PLLC

(57) ABSTRACT

A power-saving switch control mechanism for hand-held electric appliance comprises a sensor to detect the approaching hand of user and then continuously transmit signals to activate a switch into a close-circuit status in order for a cell to supply power to a control circuit of the electric appliance. When the sensor fails to detect the hand on the electric appliance, the switch returns to an open-circuit status to stop the cell from supplying power to the control circuit and stop the operation of the electric appliance accordingly.

5 Claims, 2 Drawing Sheets

HAND-HELD ELECTRIC APPLIANCE POWER-SAVING SWITCH CONTROL MECHANISM

BACKGROUND OF THE INVENTION (a) Field of the Invention

The present invention relates to a power-saving switch controller for hand-held electric appliance, and more particularly to one that enables the appliance to work only when required.

(b) Description of the Prior Art

In recent years, due to the rapid advances made in electronic industry and materials, a variety of new types of electronic parts and manufacturing technologies have successfully been developed, which significantly reduce the manufacturing cost and effectively improve features and qualities of electric appliances. Besides, the continuous improvement of manufacturing technology of semiconductor make it possible to manufacture miniature products of semi-conductor, which have replaced conventional electronic devices and enable the electric appliances to be more compact and more convenient to the consumers. Nowadays, electric appliances of high performances and lower prices, such as wireless mouse, have already become affordable for the general consumers. However, most of the electronic appliances used in our daily lives, e.g., flash light, electric razor, wireless mouse, PDA and other electric appliances, are powered by cells, which will cause some disadvantages, such as mass consumption of cells, environment contamination made by used-up cells, and extra expenses on buying cells. Therefore, how to reduce the cell consumption becomes an impending problem, which needs to be solved in the electronic industry.

SUMMARY OF THE INVENTION

The primary aspect of the present invention is to provide a power-saving switch control mechanism for hand-held electric appliance. To achieve the purpose, a sensor is provided to the holding portion on a hand-held electric appliance to detect the approaching hand of user. A control circuit connected to a switch is provided in the electric appliance. Said switch is further connected to a cell, said cell is then connected to an amplifier and in turn said amplifier is connected to the sensor. The cell is used to supply power required by the amplifier and sensor. Once the hand of an user touches the holding portion of the electronic appliance, the sensor will continuously transmit activating signals to the switch after detecting the approaching hand. The activating signal enables the switch to enter into a close-circuit status. After that, the cell starts to supply power to the control circuit of the electric appliance to make the mechanism thereof become active.

Another aspect of the present invention is to disable the sensor from transmitting the activating signal to the switch when the sensor fails to detect the hand clearing away from the holding portion on the electric appliance. The switch returns to an open-circuit status in order for the cell to stop supplying power to the control circuit, and stop the operation of the electric appliance accordingly.

DETAILED DESCRIPTION OF THE PREFERRED EMBODIMENTS

Figure 1:
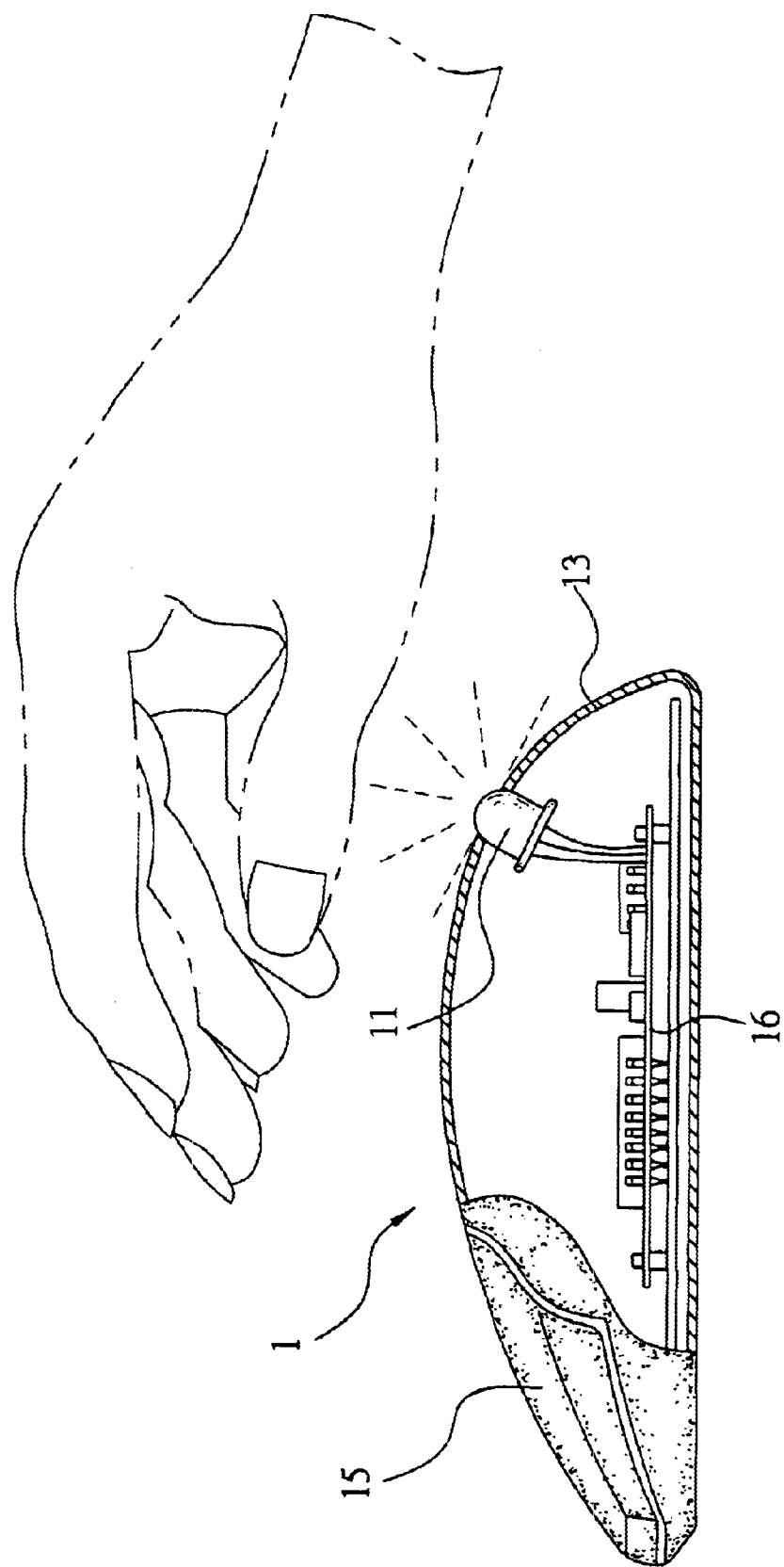
FIG. 1 is a sectional view of a preferred embodiment of the present invention.

Referring to FIG. 1, a preferred embodiment of the electric appliance 1 of the present invention comprises a sensor 11 (an infra-red sensor is used in this preferred embodiment, but that does not in any way limit the present invention in practice). Said sensor 11 is provided on a holding portion 13 of an electric appliance 1 (a wireless mouse in this preferred embodiment, again, that does not in any way limit the present invention in practice). The detection part of the sensor 11 is exposed above the surface of holding portion 13 in order for the sensor 11 to detect a hand (approximately within a 10 cm range) approaching to the holding portion 13.

Figure 2:
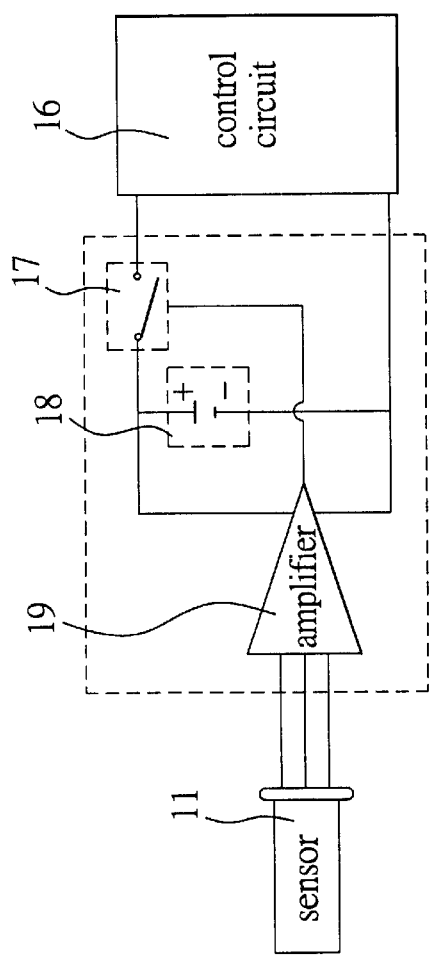
FIG. 2 is a block diagram of circuit of the preferred embodiment of the present invention.

The electric appliance 1 further comprises a casing. One end of the casing is provided with the holding portion 13 and the other end thereof is provided with keys 15 enabling a user to grip on the holding portion 13 and press these keys to operate the electric appliance 1. As illustrated in FIGS. 1 and 2, the electric appliance 1 further comprises a control circuit 16. Said control circuit 16 includes a circuit and electronic devices to maintain normal operation of the electric appliance 1, and is connected to a switch 17. Said switch 17 is connected to a cell 18, which supplies power required for the operation of the control circuit 16 while the switch is in a close-circuit status. Once the switch 17 is in open-circuit status, the cell 18 stops supplying power to the control circuit 16. Said cell 18 is connected to an amplifier 19, which is then connected to the sensor 11. Therefore, the power supplied by the cell 18 enables the amplifier 19 to receive and amplify signals transmitted from the sensor 11.

To operate the electric appliance 1, a user grips the holding portion 13 of the electric appliance 1, at the moment the sensor 11 detects the hand of user approaching to the holding portion 13, the sensor 11 will continuously transmit activating signals to the switch 17. The switch 17 is then activated and turned into a close-circuit status enabling the cell 18 to supply the power required by the control circuit 16 and to activate the electric appliance 1. When the hand of user clears away from the electric appliance 1, the sensor 11 fails to detect the hand and stops transmitting activating signals to the switch 17. The switch 17 is then turned into an open-circuit status in order for the cell 18 not to supply power to the control circuit 16, and the operation of the electric appliance 1 is stopped accordingly. Thus, the purpose of power saving is achieved, only when the hand of the user is gripping on the holding portion 13 of the electric appliance 1 and the cell 18 keeps on supplying power required by the operation of the electric appliance 1. On the other hand, when the hand of the user clears away from the holding portion 13 of the electric appliance 1, the electric appliance 1 will become inactivated, and the power of cell 18 will no more keep on consuming.

Figure 3:
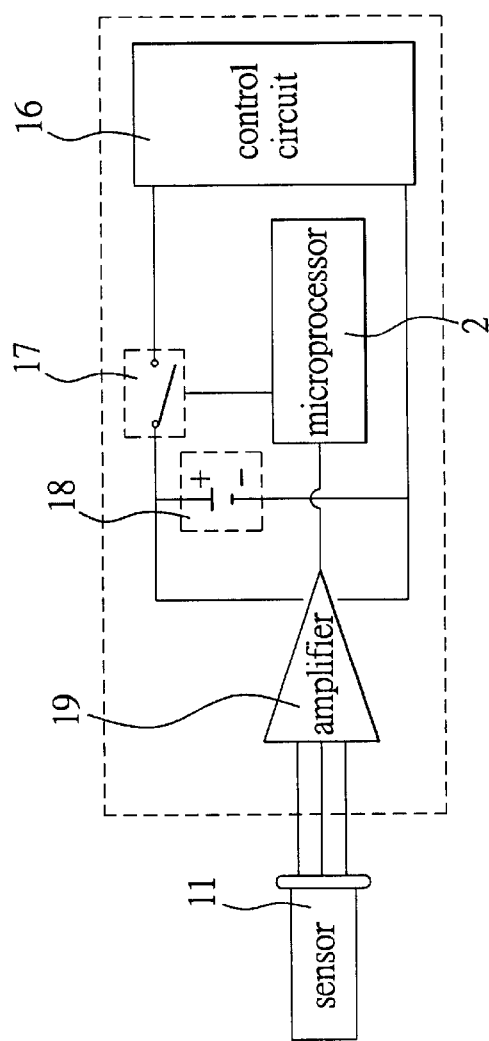
FIG. 3 is a block diagram of circuit of another preferred embodiment of the present invention.

In another preferred embodiment of the present invention as illustrated in FIG. 3, a microprocessor 2 connected to the control circuit 16 is provided between the amplifier 19 and the switch 17. Since the control circuit 16 is also connected to the switch 17 and the switch 17 is further connected to the cell 18, the cell 18 supplies the power required by the control circuit 16 when the switch 17 is turned into a close-circuit status. Once the switch 17 is turned into an open-circuit status, the power supplied from the cell 18 to the control circuit 16 is interrupted. Whereas the amplifier 19 is connected to the sensor 11 as well as to the cell 18, power supplied from the cell 18 is also supplied to the amplifier 19, the sensor 11 and the microprocessor 2 enabling them to operate in a normal condition. The amplifier 19 is used to receive and amplify signals transmitted from the sensor 11. Once the hand of user grips on the holding portion 13 of the electric appliance 1, the sensor 1 detects the hand and then continues to transmit activating signals to the microprocessor 2. The activated microprocessor 2 turns the switch 17 into a close-circuit status enabling the cell 18 to supply power to the control circuit 16, thus the electric appliance 1 is activated to a condition being operated. Until the hand of the user clears away from the holding portion 13 of the electric appliance 1, the sensor 11 fails to detect the hand and stops transmitting the activating signals to the microprocessor 2. While the microprocessor 2 no more receives the activating signal, the switch 17 is turned to an open-circuit status in order for the cell 18 to stop supplying power to the control circuit 16. The operation of the electric appliance 1 is thus terminated.

While the invention has been described by means of specific embodiments, numerous modifications and variations could be made thereto by those skilled in the art without departing from the scope and spirit of the invention set forth in the claims.

What is claimed is:

1. A power-saving switch control mechanism for a hand-held electric appliance comprising:

a sensor, provided on a holding portion on the hand-held electric appliance, a detection part of the sensor being exposed above a surface of the holding portion to detect an approaching object;

a control circuit, provided in the electric appliance and containing circuitry and electronic devices required for normal operation of the electric appliance;

a switch, connected to the control circuit and to a cell in order for the cell to supply power to the control circuit when the switch is closed and to stop supplying power to the control circuit when the switch is opened, wherein closing and opening of the switch is controlled solely by the presence or absence of activating signals from said sensor; and an amplifier connected to the switch, the sensor, and the cell for receiving and amplifying said activating signals, which are continuously transmitted from the sensor whenever the object is detected;

wherein, when the sensor detects an approaching object, the sensor continuously transmits said activating signals to the switch and holds the switch closed, enabling the cell to supply power required by the control circuit for as long as the object is detected by the sensor; and when the object clears away from the electric appliance, the sensor fails to transmit signals to the switch and opens the switch to stop supplying power to the control circuit, whereby power is only supplied to said control circuit when the object is detected by the sensor.

2. A power-saving switch control mechanism for a hand-held electric appliance as claimed in claim 1, wherein the sensor is an infra-red sensor.

3. A power-saving switch control mechanism for a hand-held electric appliance as claimed in claim 1, wherein the electric appliance is a wireless mouse.

4. A power-saving switch control mechanism for a hand-held electric appliance as claimed in claim 3, wherein the electric appliance further comprises a casing with one end thereof provided with the holding portion and the other end thereof provided with multiple keys.

5. A power-saving switch control mechanism for a hand-held electric appliance as claimed in claim 1, wherein the electric appliance further comprises a microprocessor provided between the amplifier and switch and connected to the control circuit, wherein when the sensor continuously transmits activating signals to the microprocessor after detecting the object, the microprocessor closes the switch enabling the cell to supply power to the control circuit, until the object clears away and the microprocessor fails to receive the activating signals and opens the switch to stop the cell from supplying power to the control circuit.

\* \* \* \* \*